United States Patent

[11] 3,580,627

| [72] | Inventors | Ray L. Underwood<br>65 Spokane, Pontiac, Mich. 48053;<br>Thomas A. Campbell, 4885 Clarkston<br>Road, Clarkston, Mich. 48016 |
|---|---|---|
| [21] | Appl. No. | 761,052 |
| [22] | Filed | Sept. 20, 1968 |
| [45] | Patented | May 25, 1971 |

[54] MOTOR VEHICLE LOADING AND TRANSPORTING DEVICE
2 Claims, 7 Drawing Figs.

| [52] | U.S. Cl. | 296/1,<br>105/368 |
|---|---|---|
| [51] | Int. Cl. | B60p 3/06 |
| [50] | Field of Search | 296/1 (A);<br>105/368 |

[56] References Cited

UNITED STATES PATENTS

| 3,104,127 | 9/1963 | Swartzwelder | 296/1A |
|---|---|---|---|
| 2,617,368 | 11/1952 | McCormick | 105/368 |
| 837,372 | 12/1906 | Adams | 296/1A |

*Primary Examiner*—Philip Goodman
*Attorney*—Gerald R. Hershberger

ABSTRACT: This invention provides a method or means for telescopically loading motor vehicles for transporting them including a longitudinal track detachably mounted on the chassis box frame of a supporting vehicle and a rollable carriage having rollers on its lower portion riding on said track, the upper portion of the carriage adapted to be engaged by the front axle of a second vehicle which is driven over the rear end of the supporting vehicle, the front end of the second vehicle being carried rollably forward solely by the carriage as the second vehicle is driven forwardly partly on its rear wheels and partly on the chassis of the supporting vehicle.

PATENTED MAY 25 1971

INVENTORS
RAY L. UNDERWOOD &
THOMAS A. CAMPBELL

BY Gerald R Hershberger

ATTORNEY

INVENTORS
RAY L. UNDERWOOD &
THOMAS A. CAMPBELL
BY Gerald R. Hershberger
ATTORNEY

MOTOR VEHICLE LOADING AND TRANSPORTING DEVICE

This invention relates to a device or method for transporting motor vehicles, and more particularly to a device characterized by wheel-loading means carried on a first supporting vehicle which facilitates cradling of a second supported vehicle on the chassis of the first vehicle.

Previous devices utilized to load and carry motor vehicles straddling each other have been cumbersome, greatly time consuming and primitive in operation, and generally adapted for uses and objectives which have long since become obsolete.

The vigorous competition presently existing in this art requires considerable efficiency, speed and ease of operation in loading, transporting and unloading vehicles from prime movers, and we the inventors of the instant device believes that we have greatly improved the procedure for mounting, transporting, and loading and unloading vehicles from prime movers safely.

It is therefore an object of this invention to provide a movable carriage for mounting on the chassis of a first motor vehicle which facilitates mounting of a second vehicle on the chassis of the first vehicle forward of the rear extremity thereof to save on the prime mover.

Another objective of this invention is to provide for loading one vehicle telescopically over the chassis of another vehicle by means of a wheeled carriage or cradle between the front end of the supported vehicle and the rear end of the supporting vehicle.

Another and further object of this invention is to provide a unique relatively friction-free carriage structure having a pilot which is adapted to locate the carriage structure with respect to the front end of a vehicle being mounted on the carriage.

Another object of our invention is to provide a rolling carriage means which is readily attachable to and detachable from the chassis of a supporting vehicle for carrying a second vehicle straddling the supporting vehicle so that the front end of the supported vehicle is adjacent the back of the passenger compartment of the supporting vehicle.

The foregoing, together with other objects and advantages which will become subsequently apparent, reside in the details of construction and operation as more fully hereinafter described and claimed, reference being had to the accompanying drawings which are a part hereof, wherein like numerals refer to like parts throughout, and in which:

Figure 1:
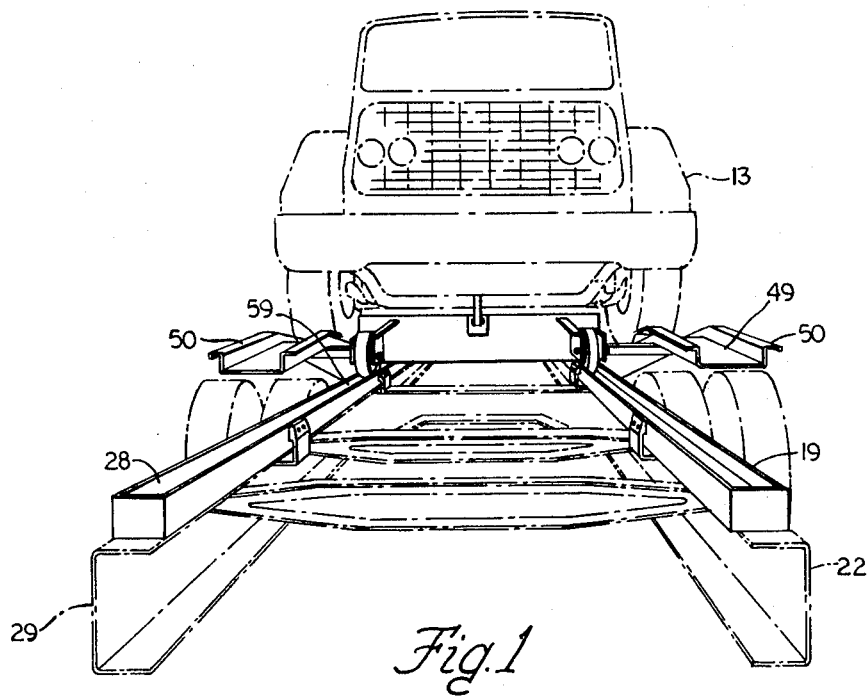
FIG. 1 is a front view looking rearwardly from the cab of a truck showing the ramp, tracks, and carriage in place in preparation for receiving the second truck which is being driven up the ramp.
Figure 2:
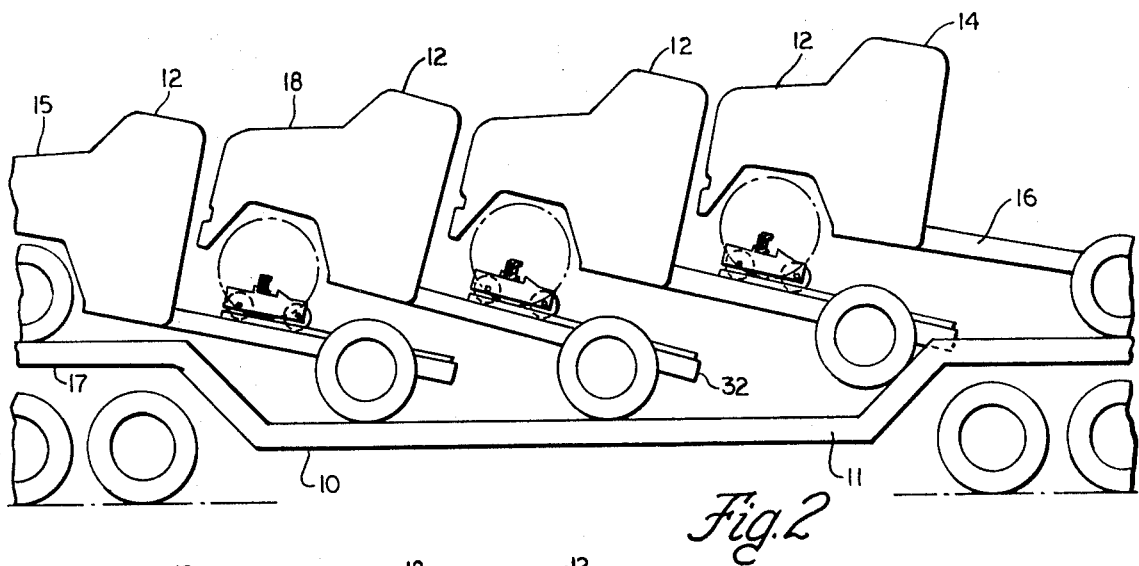
FIG. 2 is a side view showing several trucks loaded on a prime mover by means of the instant invention.
Figure 3:
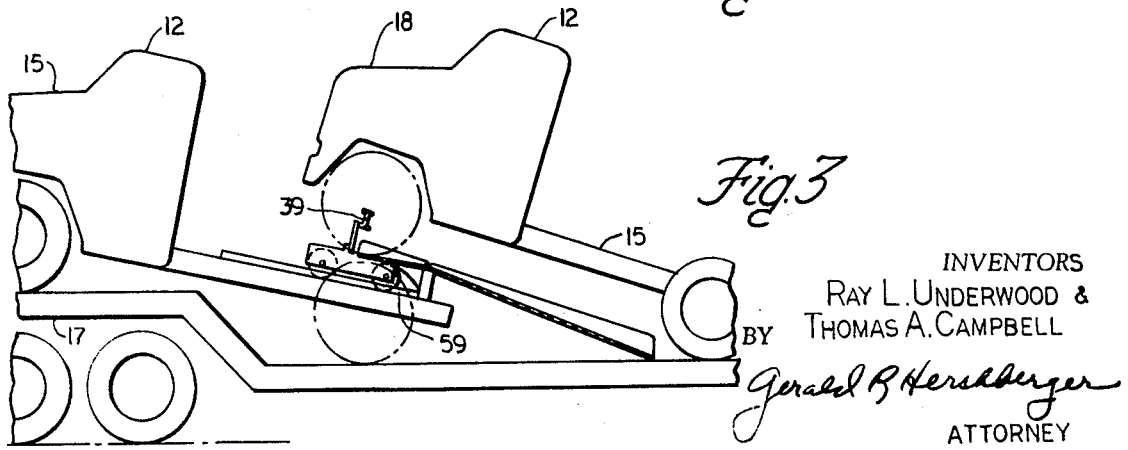
FIG. 3 is a side view showing the ramp in position on the supporting truck frame just before the front end of it drops onto the carriage.

Referring now to the drawings, the sequence of loading and transporting motor vehicles in accordance with the instant device is set forth in FIGS. 1, 2, & 3. A prime mover 10 is initially provided which has a bed 11 adapted to carry several vehicles 12, which in the instance are trucks 13 having a forward cab 14 and extended chassis frame 16 extending rearwardly of the cab for carrying a truck body (not shown). It is advantageous to conserve space on the prime mover by placing one truck as close to another truck endwise as possible to conserve space on the prime mover and to accomplish this purpose a first truck 15 is driven upon a raised platform portion 17 of the prime mover bed 11, and then a second truck 18 is driven upon the prime mover bed 11 and then driven upon the extended chassis frame 16 to straddle same. This procedure is followed until several trucks are located in said prime mover ready to be transported. The instant device facilitates the loading procedure and contributes to speed and safety of loading the trucks in such a straddling manner as will become apparent from the description that follows.

Figure 4:
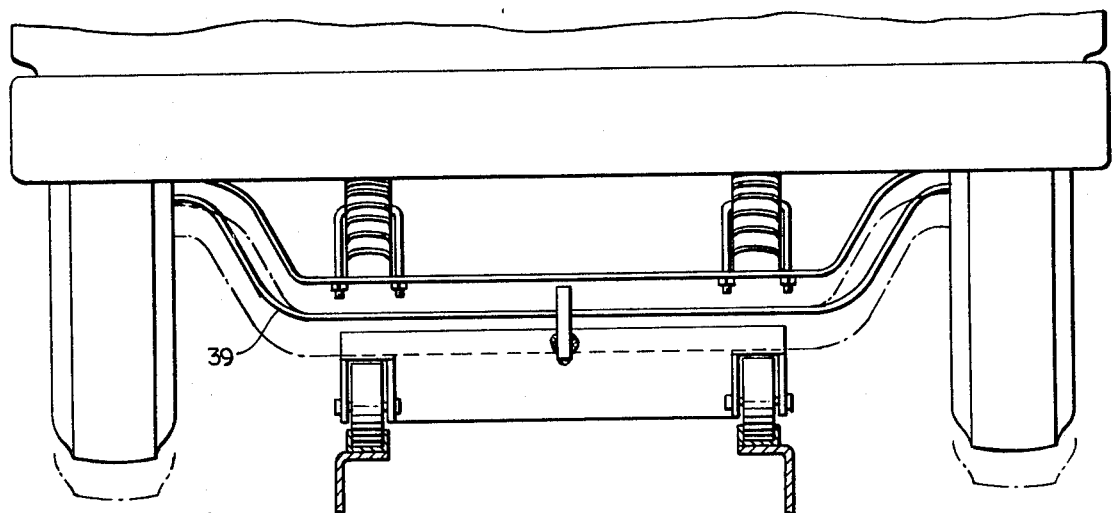
FIG. 4 is an enlarged view looking at the front end of the supported vehicle showing the carriage in relation to the front axle of the supported vehicle, and the pilot arrangement to locate the carriage with respect to said front axle.
Figure 5:
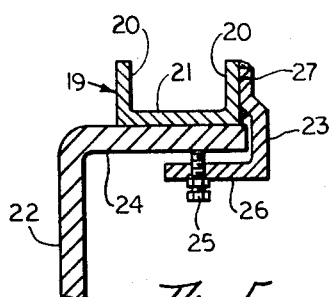
FIG. 5 is a cross-sectional view taken through the vehicle chassis frame member and the track, with the track fastening means shown holding the track detachably to said frame.
Figure 6:
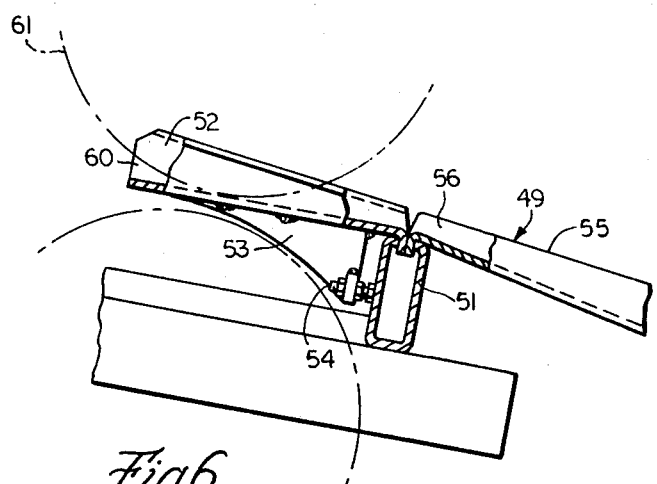
FIG. 6 is an elevational view showing the structure of the ramp means connected to the frame of the supporting vehicle.
Figure 7:
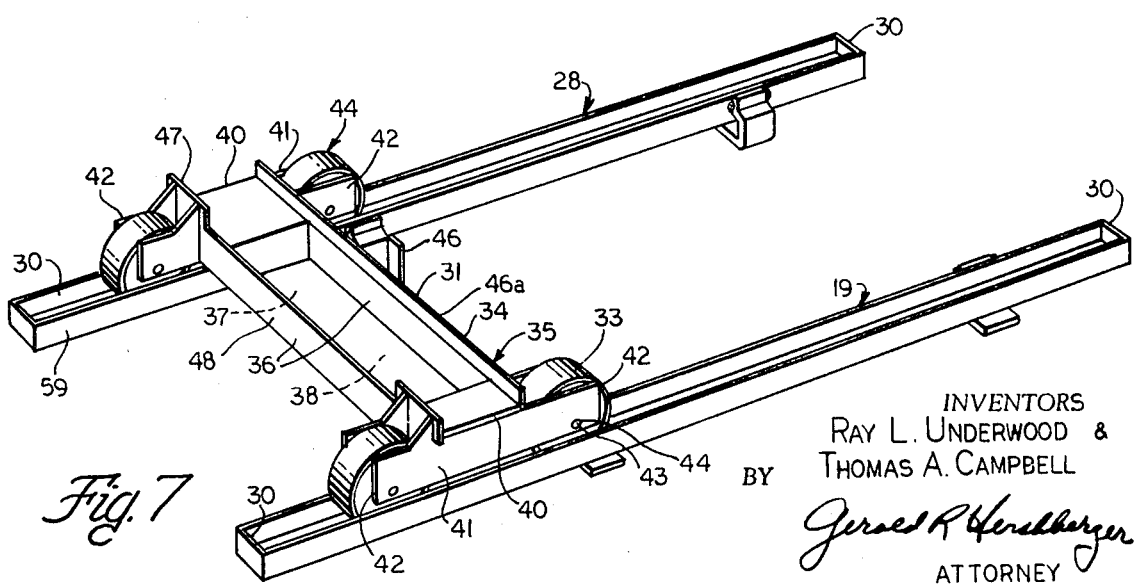
FIG. 7 is a picture view showing the transporting device assembled with the carriage means positioned on the tracks.

After the first truck is driven upon said prime mover bed, an elongated carriage track channel 19 of generally U-shaped cross-sectional outline having narrowly spaced vertically disposed parallel guide walls 20 and a connecting bottom wall 21 is mounted longitudinally on the top of chassis frame member 22 as shown in FIG. 5 and fastened securely thereto by means of an angular bracket 23 welded to the exterior 27 of guide wall 20 and a flange portion 26 is bent under flange 24 of said chassis frame member. A bolt 25 is threaded on flange portion 26 of said bracket and is tightened against the chassis frame member holding said track bottom wall detachably but securely to said chassis frame member. A second carriage track 28 is interchangeable with carriage track 19 and is fastened in similar manner to the opposite chassis frame member 29 when such construction is used on the chassis frame. The carriage tracks 19 and 28 are closed off at each end by wall 30 connecting the guide walls 20 to the bottom wall 21. The carriage assembly 31 as shown in FIG. 6 is then placed in said track 19 at the rearward extremity 32 of the chassis frame 16. The carriage assembly 31 is of generally H-shaped outline 34. The crossbar or crossmember 35 of the H is of very strong, rigid sheet steel boxed construction having parallel oppositely disposed vertical sidewalls 36, and bottom wall 37, the size of opening 38 between the crossbar sidewalls 36 is such as to receive the transverse front axle 39 of a motor vehicle to support same as shown in FIG. 4. Each end 40 of said crossbar is rigidly connected to the sidebar or member 41 of the H. Said side members are likewise of very rigid, strong, hollow sheet steel construction, each extremity thereof 42 having bearings 43 defined by axial bores 44 located therein. The axis of said bores are located parallel to said crossbar and secure rollers 44 by adjacent extremities 42 of said carriage side members. The width 33 of said rollers 44 is such as to adapt them to fit rollably between said guide walls of said track and spaced apart by said crossbar to fit into both tracks when assembled on the chassis. The carriage assembly 31 is further defined as having a locator or pilot 46 located on forward crossbar vertical wall 46a and is of such height that the front axle 39 of the supported or second truck 18 engages the pilot 45 locating said axle with respect to said carriage assembly. Raised portions 47 on rearward crossbar sidewall 48 are provided to secure said front axle within the confines of said crossbar so that the vehicle cannot slip off of the carriage. A ramp means or assembly 49 is provided at the rearward extremity of said chassis frame and comprises a pair of tracks 50 mounted on a transverse member 51 which is in turn mounted on said chassis frame. The forward portion of the track 52 is held rigid by a cantilevered brace 53 which is adjustable by screw 54 to regulate the height of the forward track portion with respect to said carriage assembly. The rearward portion 55 of said track is likewise supported pivotably by said transverse member at its forward end 56 and slanted to the prime mover bed 11 or other supporting surface at its rearward end 57.

It is now readily apparent that the track channels 19 are placed in position on the chassis frame 22 of the supporting truck 15 and clamped securely; the carriage assembly 31 is then placed adjacent the rearward portion 59 of said channels with the pilot located forwardly, the wheels 44 stopping against said end walls 30.

The ramp assembly 49 is placed in position at the rear of the chassis frame with the forward edge 60 of said ramp track located with respect to said carriage such that said front axle will engage said pilot at substantially the same time as the front wheels 61 drop off of said ramp edge as shown in FIG. 6.

The supported truck axle 39 is then cradled in said carriage assembly and the carriage is rolled forward with said axle as said supported truck is driven forwardly on its rear wheels and tied down to the prime mover platform or bed 11 by suitable means not illustrated.

The unloading procedure is carried out in reverse of that for loading, and the various cooperating parts of the invention may be then removed from the vehicle and used over again to cradle load and transport other vehicles.

Although the foregoing described construction is a useful and operable embodiment of the invention many substitutions or changes could be made therein without departing from the scope and spirit of the following claims and it is intended that the foregoing specifications and drawings are to be interpreted as illustrating and not as limiting the scope of the invention.

What I claim as new is as follows:

1. In a device for loading and transporting motor vehicles wherein the front axle portion of a second vehicle is caused to straddle the exposed chassis rear frame bed portion of a supporting vehicle during transport thereof, the combination of a generally elongated channelled track mounted on the upper portion of said rear frame portion longitudinally thereof and fastened detachably thereto; and a carriage including a track-engaging member mounted on the lower extremity thereof guided and located by said track means for substantial movement fore and aft with respect to said rear frame bed portion and a transverse cradle member carried by said track-engaging member operable to engage said front axle portion of said vehicle as said second vehicle is driven over the exposed rear frame bed portion of said first vehicle;

said cradle member cooperating with said chassis rear frame bed portion and said track to support said front end portion solely on said front axle as said second vehicle is rolled forwardly on its rear wheels from aft position adjacent the rearmost extremity of said frame portion to a forward position adjacent the passenger compartment of the supporting vehicle for transport thereof.

2. The invention as set forth in claim 1 including pilot means mounted on said cradle member to automatically locate said front axle portion in carrying relationship to said cradle member as said second vehicle is driven over said rear frame portion.